Oct. 19, 1965   C. SMITH   3,212,540
GUIDE FRAME FOR POWER DRIVEN CIRCULAR SAWS, AND THE LIKE
Filed March 28, 1963   2 Sheets-Sheet 1
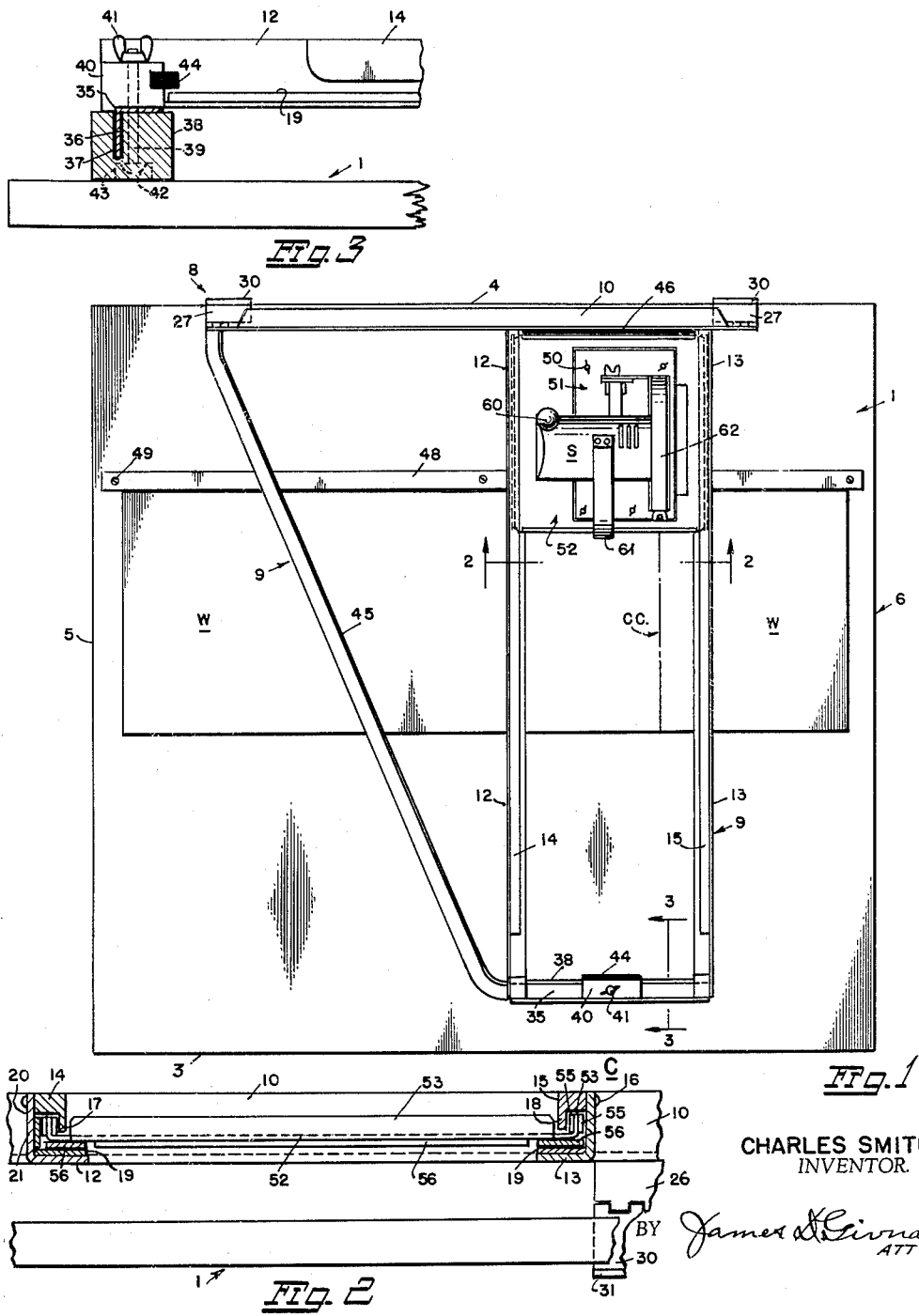
CHARLES SMITH
*INVENTOR.*
BY James L. Girvan
ATT'Y

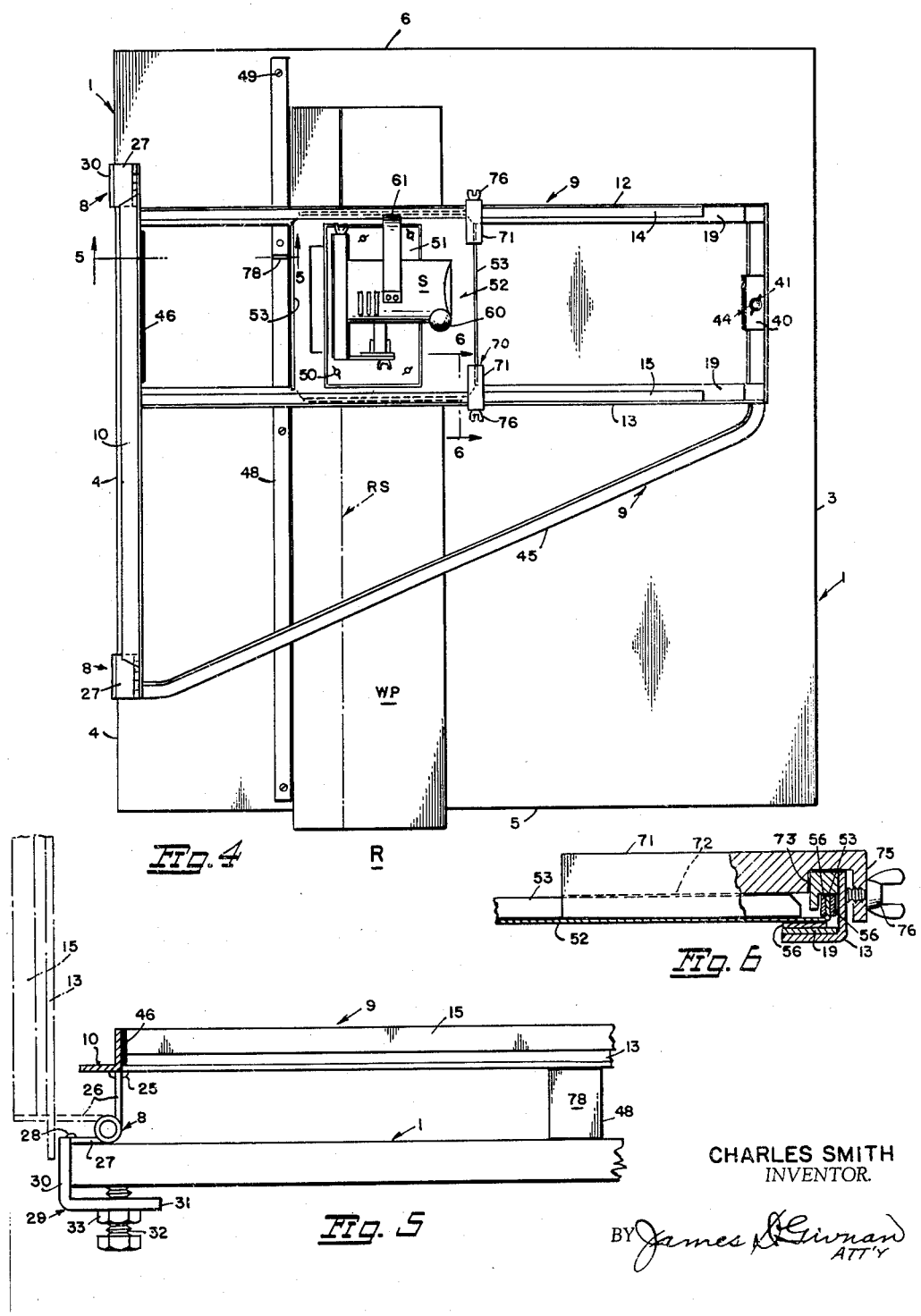

United States Patent Office
3,212,540
Patented Oct. 19, 1965

3,212,540
GUIDE FRAME FOR POWER DRIVEN
CIRCULAR SAWS, AND THE LIKE
Charles Smith, Rte. 1, Box 316, West Lynn, Oreg.
Filed Mar. 28, 1963, Ser. No. 268,815
3 Claims. (Cl. 143—47)

This invention relates generally to improvements in table saws and more particularly to a support and guide means for a power driven circular saw for cross cutting, rip sawing, miter cuts, bevel cuts and the like.

One of the principal objects of the invention is to provide a support and guide means of the character described which is of light weight, durable construction, positive and accurate in operation and one which may be conveniently hingedly attached to the flat top of a work bench, table top or the like and swung upwardly and away therefrom when not in use.

Another object is the provision of a support and guide means, as aforesaid, with which any make of power driven circular saw or similar tool may be used.

A further object is the provision of antifriction means associated with the saw base and with the guide means to insure smooth uninterrupted adjustable movement of the saw relative to the guide means in cross cutting and similar operations.

A still further object is the provision of means associated with the guide means for confining the saw base to steady movement lengthwise thereof and to prevent the saw from accidental or unintentional removal from the guide means.

A further object is the provision of a support and saw guide, as aforesaid, which in addition to its inherent advantages of a table saw also has all the advantages of a radial saw.

The foregoing and other objects and advantages which will become subsequently apparent reside in the details of construction and operation as more fully hereinafter described and claimed, reference being had to the accompanying drawings forming a part hereof and in which:

FIGURE 1 is a top plan view of the invention operatively attached to a work bench or table top with the circular saw positioned for cross-cutting operations.

FIGURE 2 is a sectional detail view on an enlarged scale taken approximately along the line 2—2 of FIGURE 1.

FIGURE 3 is a similar view taken along the line 3—3 of FIGURE 1.

FIGURE 4 is a view similar to FIGURE 1 showing the saw in an operative position for rip-sawing.

FIGURE 5 is a fragmentary end elevational view on an enlarged scale taken approximately along the line 5—5 of FIGURE 4, and FIGURE 6 is a fragmentary sectional detail view on an enlarged scale taken approximately along the line 6—6 of FIGURE 4.

With continuing reference to the drawings wherein like references of character designate like parts, and particularly FIGURES 1 to 3 thereof, reference numeral 1 indicates generally a working surface which may be a permanently fixed table top, bench top or the like, having a forward edge 3, a rear edge 4 and side edges 5 and 6. Hingedly attached to the rear edge of the table top, as indicated generally at 8 in FIGURES 1, 4 and 5, is a frame structure indicated generally at 9 comprising a rear-cross member of angle section 10 to which is rigidly and permanently secured, as by welding, the rearward end of a pair of identical track members 12 and 13 provided with inwardly extending rails 14 and 15 secured to their respective track members in any suitable manner such as by flat head or countersunk screws or bolts or the like as indicated at 16. The inner edges of the rails 14 and 15 are flanged downwardly as at 17 and 18 and the top surface of the bottom flange of each track is provided with a hard, smooth covering 19 such as Formica, or the like as is the vertical flange 20 of the track 12 as at 21, for a purpose to be more hereinafter described.

At each end of the rear-cross member 10, I secure by welding as at 25 (see FIG. 5) one plate 26 of the hinge 8 whose other plate 27 is secured by welding as at 28 to a vertical flange 30 of a clamping member 29 having a horizontal flange 31 through which threadedly extends a locking bolt 32 provided with a lock nut 33.

From the foregoing it will be readily apparent that by advancing the bolt 32 on its threads the frame structure 9 will be securely clamped to the table top and may be swung upwardly in its entirety about the hinge 26—27 into a vertical position, as shown in FIGURE 5, or slightly therebeyond by abutment of the adjacent flange of the angle section 10 with the vertical flange of the clamping member 29 and thus leave the table top free for any other useful purpose.

The forward ends of the tracks 12 and 13 are interconnected by a cross member of angle section 35 whose top horizontal flange is welded to the inwardly turned bottom flanges of the tracks 12 and 13 and whose vertical flange 36 (see FIG. 3) extends downwardly into firm engagement within a slot 37 extending throughout the length of a front fence member 38 secured to the cross angle section 35 by a bolt 39 whose shank extends through the top horizontal flange and through a bumper block 40 and provided with a thumb nut 41. The head 42 of the bolt 39 is concealed within a downwardly opening recess 43 in the fence 38. A shock absorbing member in the form of a rubber strip 44 is embedded within the block 40 and extends outwardly therefrom, as shown, for purposes to be more fully hereinafter described. The outer end of the track 12 and the left hand corner of the frame structure 9 are interconnected by a diagonal brace 45 which may be of angle section as shown. A similar bumper strip 46 is secured to the rear-cross member 10 of the frame 9. From the foregoing it will be readily apparent that I have provided a strong, rigid support and guide means for a power driven circular saw for cross cutting, rip sawing and similar operations by the unitary frame assembly comprising the two track members 12—13 permanently and rigidly secured in parallel relation throughout their length by welded securement at their forward end to the front cross member 35 and at their rearward end to a similar cross member 10 which is of considerably greater length than the front cross member and rigidly interconnected at its outermost end to the corresponding end of the front cross member 35 by the diagonal brace 45.

A fence 48 is adjustably secured to the table top 1 by wood screws 49 and may be set in any adjusted position relative to the front and rear edges of the table top for cross cutting, with the operator standing at station C in FIGURE 1 for cross cutting, or at station R in FIGURE 4 for rip sawing. Any conventional type of power driven circular saw S and its base plate 51 are removably secured by thumb screws 50, or the like to a carrier plate 52 flanged upwardly as at 53 along all four of its sides. The inside and outside surfaces of the flanges and the underside of the four marginal edges of the carrier plate are provided with similar strips 56 of hard-smooth material so as to offer minimal resistance to adjustment or movement of the saw and carrier plate lengthwise of the tracks 12 and 13 for cross cutting as in FIGURE 1, or for adjustment into position for rip sawing as in FIGURE 4. As best illustrated in FIGURE 2, the saw carrier plate 52, throughout its travel along the tracks of the guide frame, will be held in close-tolerance directional alignment by the inside and outside strips 55 along that one of its flanges 53 between the flange 17 of the rail 14 and the strip 21 along the inside of the vertical flange 20 of the track member 12, and of course by the strips 56 along the bottom edges of the carrier plate and the strips 19 along the horizontal flanges of both track members 12 and 13. This sustained operational alignment along one track section allows clearance along the opposite track for any slight variations in its unmachined surfaces.

The power saw is provided with two hand grips; one in the form of a knob 60, and the other in the form of a handle 61 and also provided with a conventional saw guard 62 over the top of the saw blade (not shown) disposed centrally of the saw guard.

For locking the saw carriage plate 52 and hence the saw S to the tracks in any adjusted position therealong or relative to the fence 48, as in FIGURE 4 for rip-sawing, I provide two identical clamping members 70 (FIG. 4), each comprising (FIG. 6) an elongated block of metal 71, provided with a downwardly opening longitudinal slot 72, engageable with one of upturned flanges 53 of the carriage plate 52, and a similar transverse slot 73 to receive the adjacent flange of the carriage plate and to provide a downwardly extending flange 75 at the outer end of the block through which a locking screw 76 extends for engagement with the plate flange for locking the same and the saw in any adjusted position as aforesaid.

Although I have shown and described the invention as adapted for use with a circular saw, it is to be understood that such disclosure does not necessarily prescribe any limits of utility of the invention since obviously other power tools such as sanders, routers and other rotary tools may be used just as effectively.

The operation of the invention for cross cutting operations, as illustrated in FIGURE 1, is as follows:

The operator standing at station C at the front edge 3 of the table 1 places a workpiece W thereupon and moves it squarely into abutment against the fence 48.

Operation of the saw blade rotating in a counterclockwise direction, as viewed from the right of FIGURE 1 and pulled toward the operator by his gripping either or both hand grips 60 and 61, will, of course, first cut through the fence 48 as indicated at 78 in FIGURES 4 and 5. Continuing counter-clockwise rotation of the saw blade and the resultant rotational bite of its teeth in a direction toward the fence 48 will maintain the workpiece firmly thereagainst throughout the length of the cut along the line CC.

Removal of the front fence member 38, for any reason, will not render the track frame 9 inoperative because of the support provided by the fence 48 which will maintain the frame in parallel relation to the working surface 1 and a workpiece supported thereon held against the fence 48. Also in cross cutting operations either of the clamping members 70, by securement to either of the tracks 12–13 at selected locations therealong, will serve as limit stops for the length of travel of the saw and its carrier plate along the tracks and thus prevent accidental damaging contact of the saw with the angle section 35 of the front cross member. A limit of saw travel in the opposite direction may also be established by securing one of the clamping members 70 to either track rearwardly of the saw carrier plate.

For rip sawing operations as illustrated in FIGURE 4, the saw S, and its carrier plate 52, after removal from the tracks 12 and 13, rotated through 90° and replaced upon the tracks, are securely held in any pre-determined position upon the tracks relative to the fence 48 by the clamping members 70. For such removal and replacement of the saw and its carrier plate it is merely necessary to remove the bumper block 40 and its bolt 39. The operator standing at station R then places the workpiece WP upon the table top 1 and moves it forwardly into the saw blade as the workpiece is guided by the fence 48 throughout the length of the cut along the line RS. The direction of rotation of the saw blade relative to the workpiece results in urging the workpiece toward the operator thus requiring a constant forward push on his part to feed the workpiece into the saw while in sliding engagement throughout the length of one of its edges with the fence 48 which is readily accomplished by the sense of feel.

It will be readily understood that the fence 48 may be of any desired length and moved into various angular positions upon the table top 1 relative to the tracks 12 and 13 and the line of travel of the saw therealong by removal and replacement of the screws 49.

The overhanging rails 14 and 15 along both tracks 12 and 13 insure maintaining the saw and its carrier plate in accurate lineal movement along the tracks without tilting or turning and prevents accidental or unintentional removal of the saw. The shock-absorbing bumpers 44 and 46 at both ends of the tracks prevent hammer-like impact of the saw carrier plate against the respective end cross members of the track frames. From the foregoing it will be seen that I have provided a rigid unitary saw-supporting structure including a rectangular frame comprising opposing tracks and parallel rails permanently reinforced against distortion by at least one diagonal brace 45. It will be readily understood that the rear cross member 10 could be extended outwardly from the track 13 to a greater extent than shown and thereat connected by a second diagonal brace (not shown) with the outer end of the track.

The power saw S by means of its base or carrier plate 52 is slidable lengthwise of the tracks and lockable relative thereto in any selected position therealong for rip-sawing operations. The unitary frame structure because of its inherent rigidity may be swung upwardly from a horizontal operative position into a vertical position or slightly therebeyond leaving the table top free for any other useful purpose as aforesaid. The saw, through the medium of its carrier plate 52 and the opposing clamp members 70, can be fixedly and securely held for continuing operation at the same dimension when the rigid frame structure is lowered into its original horizontal operative position.

While I have shown a particular form of embodiment of my invention, I am aware that many minor changes therein will readily suggest themselves to others skilled in the art without departing from the spirit and scope of the invention. Having thus described my invention what I claim as new and desire to protect by Letters Patent is:

1. A support and guide frame for a power saw,
   said frame having a forward end and a rearward end and comprising a pair of parallel track members of angle section, each having a vertical flange and a horizontal flange throughout the length thereof,
   a first cross member permanently secured to the forward end of said track members,
   a second cross member permanently interconnecting the rearward end of the track members extending outwardly from both sides thereof to a greater extent from one side than from the other and cooperating with said first cross member in maintaining the track members in rigid parallel relation to each other,
   means at both ends of said second cross member hingedly attaching said frame to a horizontal support,
   a rigid diagonal brace permanently interconnecting said extended end of said second cross member and the corresponding end of said first cross member,
   rail members substantially coextensive in length with said track members and secured one each to the vertical flanges of the track members in vertical spaced relation to the horizontal flanges thereof,
   each of said rail members having a downwardly extending flange throughout the length thereof in lateral spaced relation to said vertical flanges of said track members, a power saw carrier plate of square formation flanged upwardly along its four sides slidably mounted upon said track members, smooth-surface strips of wear-resistant material secured along the horizontal flanges of both of said track members and along the vertical flange of one of said track members, similar strips of said material secured along the inside and outside of the vertical flanges of said carrier plate and along the four bottom marginal edges thereof, whereby said carrier plate will be held in close tolerance directional guidance throughout its length of travel along said track frame by sliding contact of said strips of wear-resistant material carried by the bottom and flanges of said carrier plate with those of said one of said track members and with said downwardly extending flange of the respective rail, regardless of surface irregularities in the flanges of the other of said track members.

2. A support and guide frame for a power saw as claimed in claim 1 including, at least one clamping member for locking the carrier plate at a fixed position on the track frame relative to a workpiece supported upon said horizontal support, said clamping member comprising an elongated block having a downwardly opening longitudinal slot therein engageable with one of said carrier plate flanges and opening at one of its ends into a transverse slot engageable with other of said carrier plate flanges and with said vertical flange of one of said track members and its respective rail member, and means locking said clamping member in any selected location along said track members.

3. Sawing apparatus comprising in combination a horizontal supporting surface, a fence removably secured to said supporting surface, a guide frame for a power saw, said frame having a forward end and a rearward end and comprising a pair of parallel track members of angle section each having a vertical flange and a horizontal flange throughout the length thereof, a first cross member secured to the forward end of the track members, a second cross member permanently interconnecting the rearward end of the track members extending outwardly from both sides thereof to a greater extent from one side than from the other and cooperating with said first cross member in maintaining the track members in rigid parallel relation to each other, means at both ends of said second cross member hingedly attaching said frame to said horizontal support in a normal position of repose upon said fence and supported thereby in parallel relation to the horizontal support, a rigid diagonal brace permanently interconnecting said extended end of said second cross member and the corresponding end of said first cross member, a power saw carrier plate of square formation flanged upwardly along its four sides slidably mounted upon said track members and adapted to support a power saw, means maintaining said saw carrier plate on said track members throughout the length of its travel therealong, clamping members, and means removably securing said clamping members to the track members selectively forwardly and rearwardly of said saw carrier plate to limit its travel along the track members.

References Cited by the Examiner

UNITED STATES PATENTS

| | | | |
|---|---|---|---|
| 1,529,303 | 3/25 | Drucker | 143—47 |
| 2,318,800 | 5/43 | Rakow | 308—3.6 |
| 2,719,761 | 10/55 | Bonnafe | 143—47 |
| 2,735,455 | 2/56 | Forsberg | 143—6 |
| 2,759,773 | 8/56 | Wilmer et al. | 308—3.6 |
| 2,765,820 | 10/56 | Perkins | 143—6 |
| 2,802,493 | 8/57 | Horneland | 143—47 X |
| 2,810,412 | 10/57 | Roug | 143—6 X |
| 2,815,252 | 12/57 | Baker | 308—3.6 |
| 2,903,026 | 9/59 | Frydenlund | 143—6 |
| 2,911,017 | 11/59 | Holder | 143—47 |
| 3,044,507 | 7/62 | Esposito | 143—47 |
| 3,073,360 | 1/63 | Villanueva | 143—6 |

FOREIGN PATENTS 783,112   9/57   Great Britain.

ANDREW R. JUHASZ, *Primary Examiner.*

LEON PEAR, *Examiner.*